US006135340A

United States Patent [19]

Stansbury

[11] Patent Number: 6,135,340

[45] Date of Patent: Oct. 24, 2000

[54] BONDING AND INSPECTION SYSTEM

[75] Inventor: Daryl M. Stansbury, Boise, Id.

[73] Assignee: Micron Technology, Inc., Boise, Id.

[21] Appl. No.: 09/392,819

[22] Filed: Sep. 9, 1999

Related U.S. Application Data

[62] Division of application No. 08/828,877, Mar. 31, 1997.

[51] Int. Cl.[7] .......... B23K 37/04; B23Q 16/00

[52] U.S. Cl. .......... 228/9; 228/6.2; 228/49.1; 228/103

[58] Field of Search .......... 228/4.1, 6.2, 7, 228/8, 9, 10, 12, 44.7, 49.1, 102, 103

[56] References Cited

U.S. PATENT DOCUMENTS

| | | | |
|---|---|---|---|
| 3,838,274 | 9/1974 | Doubek, Jr. et al. | 250/201 |
| 4,052,603 | 10/1977 | Karlson | 364/120 |
| 4,568,189 | 2/1986 | Bass et al. | 356/401 |
| 4,606,643 | 8/1986 | Tam | 356/401 |
| 4,945,407 | 7/1990 | Winnek | 358/88 |
| 5,022,580 | 6/1991 | Pedder | 228/56.3 |
| 5,042,709 | 8/1991 | Cina et al. | 228/105 |
| 5,633,103 | 5/1997 | DeMarco et al. | 430/5 |
| 5,634,585 | 6/1997 | Stansbury | 228/105 |
| 5,639,323 | 6/1997 | Jordan | 156/64 |
| 5,649,847 | 7/1997 | Haven | 445/24 |
| 5,661,601 | 8/1997 | Kang et al. | 359/562 |
| 5,807,154 | 9/1998 | Watkins | 445/25 |
| 5,876,884 | 3/1999 | Maeda et al. | 430/22 |
| 5,886,971 | 3/1999 | Feldman et al. | 369/112 |
| 5,895,554 | 4/1999 | Gordon | 156/556 |
| 5,896,158 | 4/1999 | Brenner, Jr. et al. | 347/116 |
| 5,923,990 | 7/1999 | Miura | 438/401 |
| 5,984,748 | 11/1999 | Ritter et al. | 445/24 |

OTHER PUBLICATIONS

Automated Flip Chip Bonder, AFC 101 AP, RD Automaticn, Piscataway, New Jersey.

Hughes Model 3500, Automatic Component Assembly Cell, Hughes Aircraft Company, Carlsbad, CA, 1994.

Iversen, Wesley R., "Component placement and insertion review;" includes related article; Cover Story, vol. 36, No. 1, p. 14; ISSN: 1050–8171, Jan. 1993, Copyright Hitchcock Publishing Company 1993.

LeFort, Bob; Constaninou, Tat, "Ultra–miniature surface mount semiconductors", Copyright Society of Automotive Engineers Inc., 1989—Automotive Engineering.

Microwave Journal, vol. 38, No. 2, Feb., 1995, p. 128, "Polymer flip chip Psub fC: a solderless bump process", Copyright 1195 Horizon House Publications Inc.

MRSI–503M, Precision Flip Chip Die Assembly System View: Up/Down, Micro Robotics Systems, Inc., Chelmsford, MA.

MicroPlace 1000F—Flip Chip Assembly System, SIERRA Research and Technology, Inc., Westford, MA.

MicroPlace 2000F—Flip Chip Assembly Systems, SIERRA Research and Technology, Inc., Westford, MA.

Panasonic, Doc. No. TI–645–0793 Specifications, Flip Chip Bonder, Panasert BF, Mitsushita Electric Industrial Co., Ltd.

The First Assembly System for the 21st Century, ZEVATECH Inc., Morrisville, NC, Feb. 1993.

The Multi–Function Precision Assembly System, ZEVATECH Inc., Morrisville, NC, Oct. 1993.

Universal Flip Chip Bonder—Model FC950, ULTRA t Equipment Co., Fremont, CA.

*Primary Examiner*—Patrick Ryan
*Assistant Examiner*—Kiley Stoner
*Attorney, Agent, or Firm*—Hale and Dorr LLP

[57] ABSTRACT

A system and method that permits the accuracy of alignment of a transparent substrate relative to a second substrate to which it is bonded to be evaluated on-line, after the two substrates have been bonded together. The alignment of the two substrates is viewed through the transparent substrate as the bonded-together substrates are being transported between the station at which the bonding occurred and another processing station.

8 Claims, 9 Drawing Sheets

BONDING AND INSPECTION SYSTEM

CROSS-REFERENCE TO RELATED APPLICATION

This application is a divisional of now-pending Ser. No. 08/828,877 filed on Mar. 31, 1997.

GOVERNMENT RIGHTS

This invention was made with U.S. Government support under Contract No. DABT 63-93-C-0025 awarded to Advanced Research Projects Agency (ARPA). The Government has certain rights in this invention.

FIELD OF THE INVENTION

This invention relates to electronic devices, and, more particularly, to providing accurate alignment of components of such device, and most particularly to field emission display ("FED") devices.

BACKGROUND OF THE INVENTION

As technology for producing small, portable electronic devices progresses, so does the need for electronic displays which are small, provide good resolution, and consume small amounts of power in order to provide extended battery operation. Past displays have been constructed based upon cathode ray tube ("CRT") or liquid crystal display ("LCD") technology. However, neither of these technologies is perfectly suited to the demands of current electronic devices.

CRT's have excellent display characteristics, such as color, brightness, contrast and resolution. However, they are also large, bulky and consume power at rates which are incompatible with extended battery operation of current portable computers.

LCD displays consume relatively little power and are small in size. However, by comparison with CRT technology they provide poor contrast, and only limited ranges of viewing angles are possible. Further, color versions of LCDs tend to consume power at a rate which is incompatible with extended battery operation.

At least partially as a result of the above described deficiencies of CRT and LCD technology, efforts are underway to develop new types of electronic displays for the latest electronic devices. One technology currently being developed is known as "field emission display technology." The basic construction of a typical field emission display, or ("FED"), is shown in FIG. 1. As seen in FIG. 1, field emission display 10 comprises an anode, generally designated 20, a cathode, generally designed 30, and a plurality of spacers 40 which prevent the anode 20 and cathode 30 from being pushed into contact with each other by exterior atmospheric pressure when the space between the anode and cathode is evacuated.

The anode 20 typically comprises a flat glass plate 101 with a transparent conductor layer 102 formed on its lower surface. The screen area of the anode (designated 104 in FIG. 2) includes a large number of phosphor dots 112 formed on the lower surface of transparent conductor 102.

Cathode 30 comprises a substrate or baseplate 114 on which thin conductive row electrodes 108 are formed. Silicon baseplate 114 may be single crystal silicon. The row electrodes may be formed from doped polycrystalline silicon that is deposited on the baseplate and serves as the emitter electrode, and are typically deposited in strips that are electrically connected. A resistive layer (not shown) may be deposited on top of the row electrodes 108 and spaced-apart cathode emitters 106 are in turn formed on top of the row electrodes 108. Also formed on the row electrodes 108 and baseplate 114 is a dielectric layer 116 on which, in turn, is a conductive layer 110 which forms a gate electrode and controls the emission of electrons 107 from emitters 106. Typically, millions of emitters 106 are required to provide a spatially uniform source of electrons.

FIG. 2 is a exploded diagram of an FED package, showing the anode 20 and cathode 30 of FIG. 1, together with additional components (e.g., a getter 35, a seal frit 40, backplate seal ring 45, frit layer 50, and backplate 55 with a compressible dot 60) that are typically included in the complete FED package. As is apparent from FIG. 2, it is important that the various components of the FED package, particularly the anode 20 and cathode 30, be positioned accurately relative to each other.

Conductors on a spacer ring 22 on anode 20 are bonded to conductive leads on the cathode 30, and the cathode and anode must be precisely positioned to each other at the time this bond is made. One method of connecting the conductive leads on the cathode 30 to the conductors on the spacer ring 22 of anode 20 is commonly known as flip chip bonding. In flip chip bonding, contact pads (not shown) on one substrate, e.g., on cathode 30, are provided with conductive "bumps" which are carefully aligned with the conductors on the spacer rail of another substrate (e.g., of anode 20). An apparatus commonly referred to as a flip chip bonder then bonds the contact pads of the cathode to the conductors of the anode using a process commonly referred to as thermo-compression bonding. Although the following discussion is directed to a procedure using a flip chip bonding machine or bonder used to bond the anode 20 and cathode 30 of an FED, it will be understood that procedures employing other types of bonders or the bonding of substrates of different devices are equally applicable.

Regardless of the particular bonder or procedure employed, the alignment between the cathode 30 and anode 20 is critical to obtaining a properly functioning FED. Accordingly, many flip chip bonders and the like are provided with some type of "machine vision" system which automatically aligns the cathode and anode prior to bonding.

However, machine vision alignment systems are not sufficiently accurate to ensure completely acceptable alignment. Therefore, after various portions of a device have been bonded together, the device is removed from the production line and taken to a test station at which a test procedure, commonly referred to as "veneering," is performed to evaluate the accuracy of the alignment.

FIG. 3 shows exemplary aligning marks 301, 305, (commonly referred to as "fiducials") on a pair of substrates 300 and 304 (which may be, for example, an anode assembly 20 and cathode assembly 30). In the prior art systems and in the practice of the present invention, aligning marks 301, 305 are used by a "machine vision" system to align the two substrates just prior to the two substrates being bonded together.

FIG. 3 also shows exemplary veneering marks 302, 306 on, respectively, substrates 300 and 304, for use in post-bonding inspection and evaluation. As will be apparent, aligning marks 301, 305 are provided adjacent two diagonally opposite corners of the substrates, while veneering marks 302, 306 are provided along pairs of adjacent edges.

Each aligning mark 305 on substrate 304 (e.g., on an anode assembly 20) is an open circle or "doughnut", typically having an inner diameter of about 100 microns and an outer diameter of about 200 microns. Each aligning mark 301 on substrate 300 (e.g., on a cathode assembly 30) is a solid round dot about 50 microns in diameter.

According to prior art practice, a "machine vision" system (e.g., a so-called "look-up, look-down" imaging system of the type used conventional flip bonders (those sold by Sierra Research and Technology, Inc. of Westford, Mass., Micro Robotics Systems, Inc. of Chelmsford, Mass. and RD Automation of Piscataway, N.J.) are used to automatically to align the two substrates to be bonded together so that each solid dot 301 on substrate 300 is centered within a respective round doughnut 305 on substrate 304. The machine vision system views the alignment marks on the two substrates and, either using pattern recognition software or by projecting images of the substrates on a video screen where they may be viewed by an operator, achieves alignment of the two substrates so that each solid dot 301 on substrate 300 is centered within a respective round doughnut 305 on substrate 300. This alignment is achieved with the two substrates in close proximity to each other, and the only additional movement required to bring them into contact for bonding is in the z-direction.

According to the prior practice, after the two substrates have been bonded together, the workpiece is removed from the production line and taken to a test station at which the veneering marks 302 and 306 are employed to evaluate the accuracy of the alignment of the substrates, e.g., of the anode assembly 20 and cathode assembly 30, under a microscope. Desirably, the two substrates will be aligned so that each veneering mark 302 on substrate 300 will be centered within a respective veneering mark 306 on the other substrate 304.

The configurations of veneering marks 302 and 306 are most clearly shown in FIGS. 4 and 5.

As shown in FIG. 4, each veneering mark 306 on substrate 304 comprises a row of identical boxes 401, equally spaced from each other. In the illustrated embodiment, each veneering mark 306 includes twenty aligned boxes 401.

Referring now to FIG. 5, each veneering mark 302 on substrate 300 includes a row of axially aligned bars 501. Each bar 501 is exactly the same length, a length equal to distance between a pair of adjacent boxes 401 so that each bar is capable of fitting precisely in the interval between a pair of adjacent boxes. The center-to-center spacing of bars 501, however, is slightly different than (in the illustrated embodiment 0.5 microns greater than) the center-to-center spacing of boxes 401; and the total number of bars 501 in each veneering mark 302 (in the illustrated embodiment twenty-one bars) is typically different (in the illustrated embodiment one greater than) from the number of boxes 401 in the corresponding veneering mark 306. A pair of arrows 502 are provided on the opposite sides of the center bar 501*a,* with the heads of the arrows pointing towards each other.

FIGS. 6, 6A and 7 illustrate the relative positioning of superposed veneering marks 302, 306 when the two substrates are (FIGS. 6 and 6A) or are not (FIG. 7) precisely and accurately aligned relative to each other. In each of FIGS. 6 and 7, the two arrows 502 of veneering mark 302 are positioned in the two center boxes 401*a,* 401*b* of mark 306.

In FIGS. 6 and 6A, in which the two substrates are aligned, the ends of the center bar 501*a* of mark 302 are tangent to the adjacent edges of boxes 401*a* and 401*b*. In FIG. 7, in which the two substrates are not perfectly aligned, center bar 501*a* is offset slightly, so that its left end is spaced slightly from the adjacent edge of box 401*a* and its right end projects slightly into box 401*b*. However, it will also be noted that the ends of another bar, i.e., bar 501*g,* appear to be tangent to the sides of the two boxes 401*f* and 401*g* between which the bar is positioned. Thus, the extent of the misalignment of the marks 302 and 306 in FIG. 7 can be accurately be determined simply by counting the number of boxes 401 between the bar 501*a* between the two center boxes 401*a,* 401*b,* and the apparently aligned bar 501*g*. In FIG. 7, there are six such boxes, and the extent of the misalignment is accordingly six (6) times the difference (0.5 microns) between the center to center spacings of the bars and boxes, or 3.0 microns.

It will thus be appreciated, that existing "veneering" procedures make it possible vary accurately to evaluate the extent of misalignment between two components that have been bonded together. Unfortunately, in order to evaluate alignment using such existing procedures, the device being evaluated must be taken out of the production line for evaluation, and then returned to the production line when the evaluation is complete. This results in production delays and additional product handling. There is a need for a system which evaluates and improves the quality of the alignment between the die and the substrate on-line.

SUMMARY OF THE INVENTION

The present invention provides a system and method that permits the accuracy of alignment of a transparent substrate relative to a second substrate to which it is bonded to be evaluated on-line, after the two substrates have been bonded together. According to a preferred embodiment, the alignment of the two substrates is viewed through the transparent substrate at an in-line inspection station to which the bonded-together substrates being transported from the station at which the bonding occurred, and preferably before the substrates are transported to a subsequent processing station.

In some preferred embodiments in which the two substrates are the anode (which is transparent) and cathode of an FED device, the system includes device carrier having an open bottom which supports the bonded-together cathode and anode assemblies, an alignment observer positioned below the carrier for observing the alignment marks on the assemblies and producing a signal representative of the observed alignment, and a display for receiving the signal and providing an image that permits the spatial relationship of the alignment marks to be determined.

DESCRIPTION OF THE DRAWINGS

For a more complete understanding of the invention and for further advantages thereof, reference is made to the following detailed description taken in conjunction with the accompanying drawings, in which.

DETAILED DESCRIPTION

Figure 8:
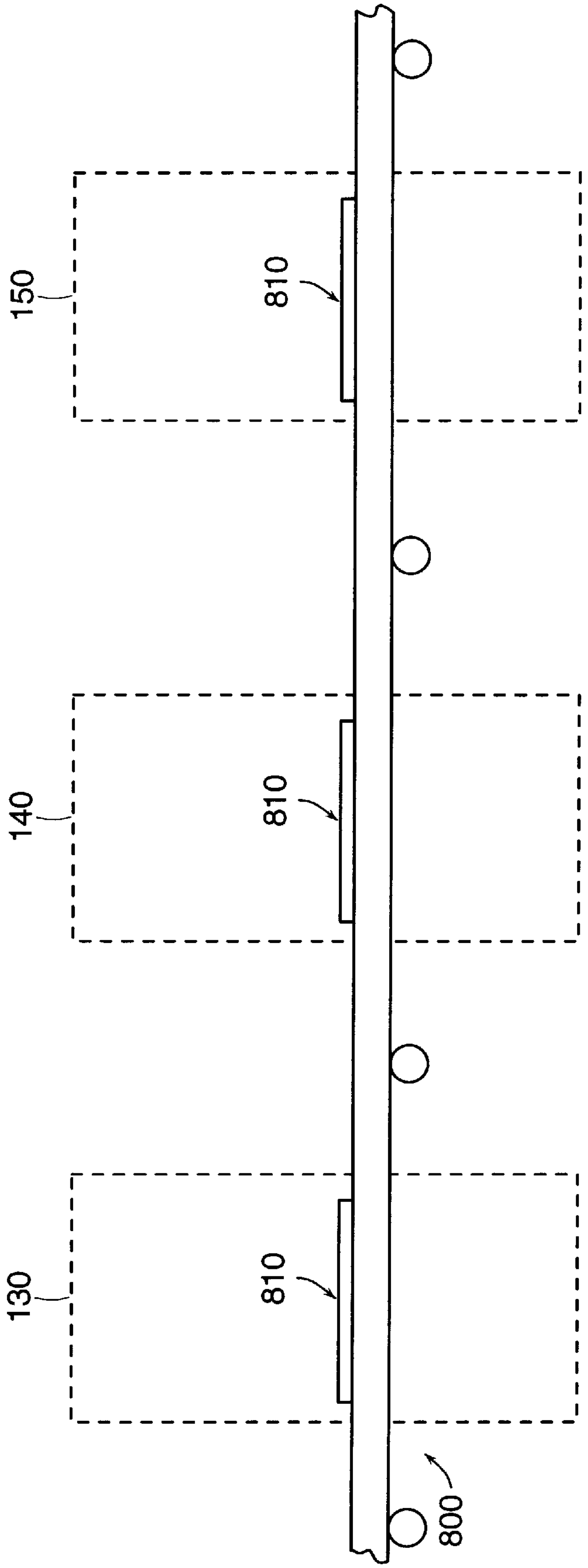
FIG. 8 is a schematic of an FED production system according to an embodiment of the invention.
Figure 9:
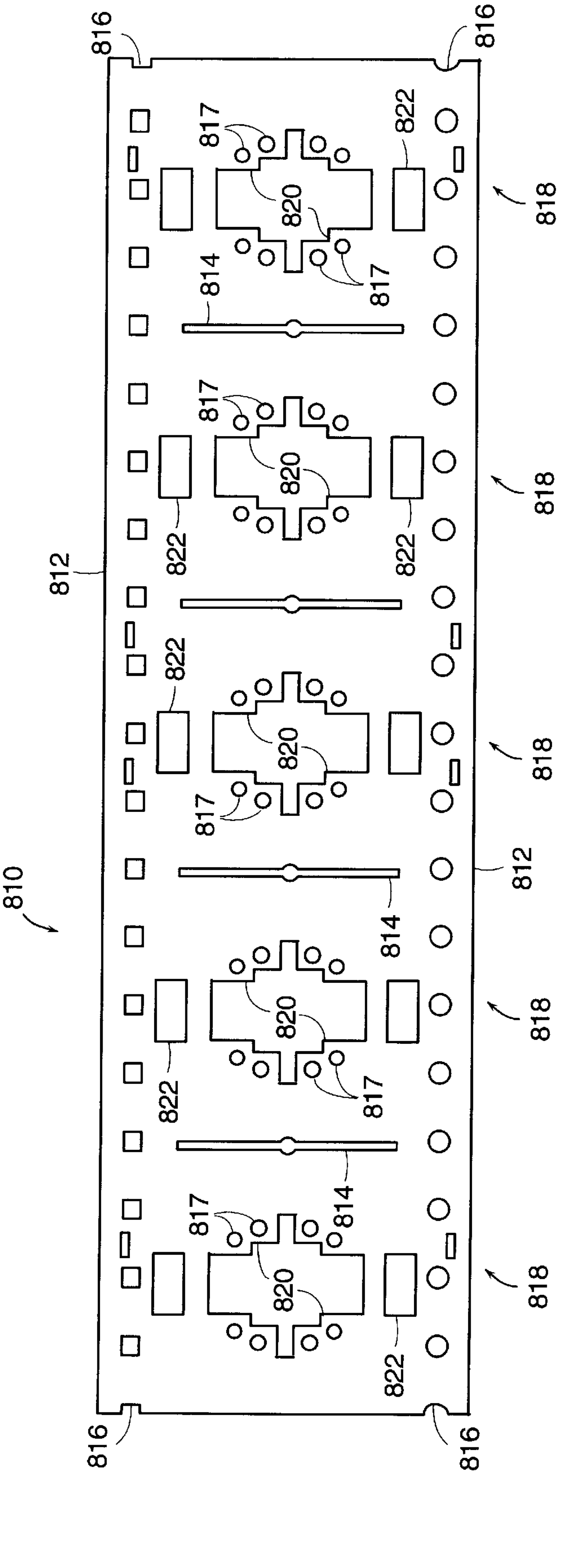
FIG. 9 is a plan view of a device carrier used in the practice of the present invention.

Reference is now made to FIG. 8 which schematically shows a portion of an FED production line in which a conveyor system generally designated 800 advances device carriers 810 (illustrated in more detail in FIG. 9, each of which supports a plurality (in the illustrated embodiment five) FED workpiece(s) as the workpieces advance through a number of successive workstations, designated 130, 140 and 150 respectively. In the illustrated system, the first workstation 130 (illustrated in more detail in FIG. 10) includes a flip chip bonder for bonding the cathode assembly 30 and anode assembly 20 of an FED together, the second workstation 140 (illustrated in more detail in FIG. 11) includes an alignment inspector for inspecting the alignment of the now bonded-together cathode assembly 30 and anode assembly 20, and the third workstation 150 includes a system (which itself is generally conventional in design and forms no part of the present invention) for assembling an acceptably aligned and bonded-together cathode assembly into a complete sealed FED package.

Referring now to FIG. 9, each device carrier 810 comprises a metal plate, the opposite longitudinal edges 812 of which are rolled downwardly to provide longitudinal stiffening and which also carries regularly spaced transverse stiffening ribs 814. Locator notches 816 are provided at the opposite ends of carrier 810, and locator holes are provided along the side edges of carrier 810, for positioning the carrier on conveyor 800. The conveyor 800 supports carriers 810 along their-opposite longitudinal edges so that, as discussed hereinafter, the bottom of the carrier is unobstructed.

Carrier 800 also includes five FED workpiece locating portions, generally designated 818, that are precisely positioned relative to each other and are spaced longitudinally along the carrier 810. Each workpiece locating portion includes eight edge locators 817 projecting upwardly from the top of carrier 810, a central recess 820 generally between locators 817, and a pair of smaller recesses 822 at the opposite transverse sides of recess 820. In practice, edge locators 817 engage the edges of the anode assembly 20 of an FED being manufactured and hold it in position on carrier 810. The anode assembly 20 is designed so that the alignment marks 305 and veneering marks 306 on the it (and the alignment marks 306 and veneering marks 306 on the cathode assembly 30 after it is bonded to anode assembly) will be positioned within the bounds of recess 820.

Figure 10:
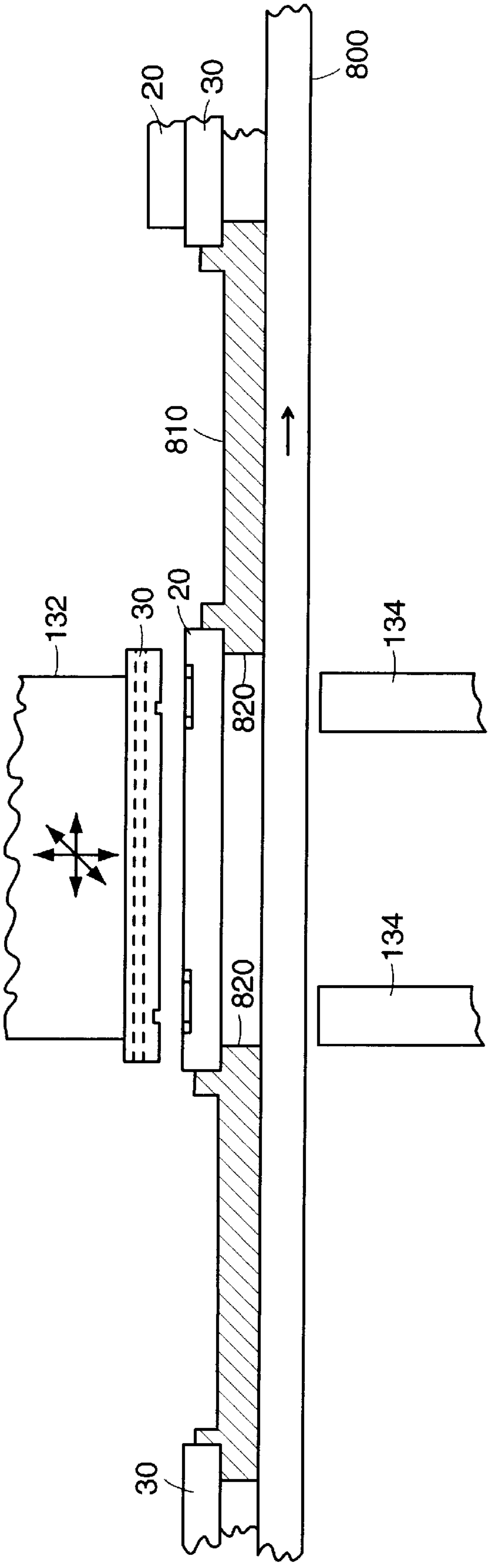
FIGS. 10 and 11 are schematic diagrams of portions of the production system of FIG. 8.

As shown in FIG. 10, workstation 130 includes a flip chip bonder that is used to thermocompression bond a cathode 30 to an each of the anodes 20 carried by device carrier 810. One example of a bonder useful with the present invention is the MICRON-2, manufactured by Zevatech, Inc. Others include the an AFC-101-AP bonder manufactured by RD Automation, Inc., the MRSI-503M flip chip bonder manufactured by Micro Robotics Systems, Inc., and the model FC950 manufactured by ULTRA T Equipment Co. Other types of bonders, such as TAB bonders, may also be used.

As shown in FIG. 10, the machine vision system of the bonder in station 130 includes a pair of fixed CCD cameras 134 positioned below conveyor 800, rather than a conventional "look-up look-down" optical system. Otherwise, the bonder, including its machine vision system, are conventional. Conveyor 810 advances device carrier 810 in steps past the machine head 132 of the bonder and cameras 134. As each anode assembly 30 carried by device carrier 810 is advanced into position above cameras 134, machine head 132 picks up a cathode assembly 30 and moves it into place above the anode assembly 20. The CCD cameras 134 view the alignment marks carried on the cathode and anode assemblies, looking upwardly through the transparent anode assembly 20 from below conveyor 100. The machine vision system of the bonder processes the information supplied by each camera 134, and the positional information moves the machine head in the x, y and theta directions until the system determines that the alignment marks are properly aligned. The machine head then bonds the cathode 30 and anode 20 together.

After the cathode 30 and anode 20 have been bonded together, conveyor 800 advances carrier 810 to alignment inspection station 140 at which an inspection apparatus evaluates the alignment between the bonded-together cathode and anode. As shown, the inspection apparatus includes a video camera 162 mounted below conveyor 800 in position to look through recess 820 in carrier 810 and view the veneering marks on cathode 30 and anode 20 through the transparent glass plate 101 of anode 20.

Figure 11:
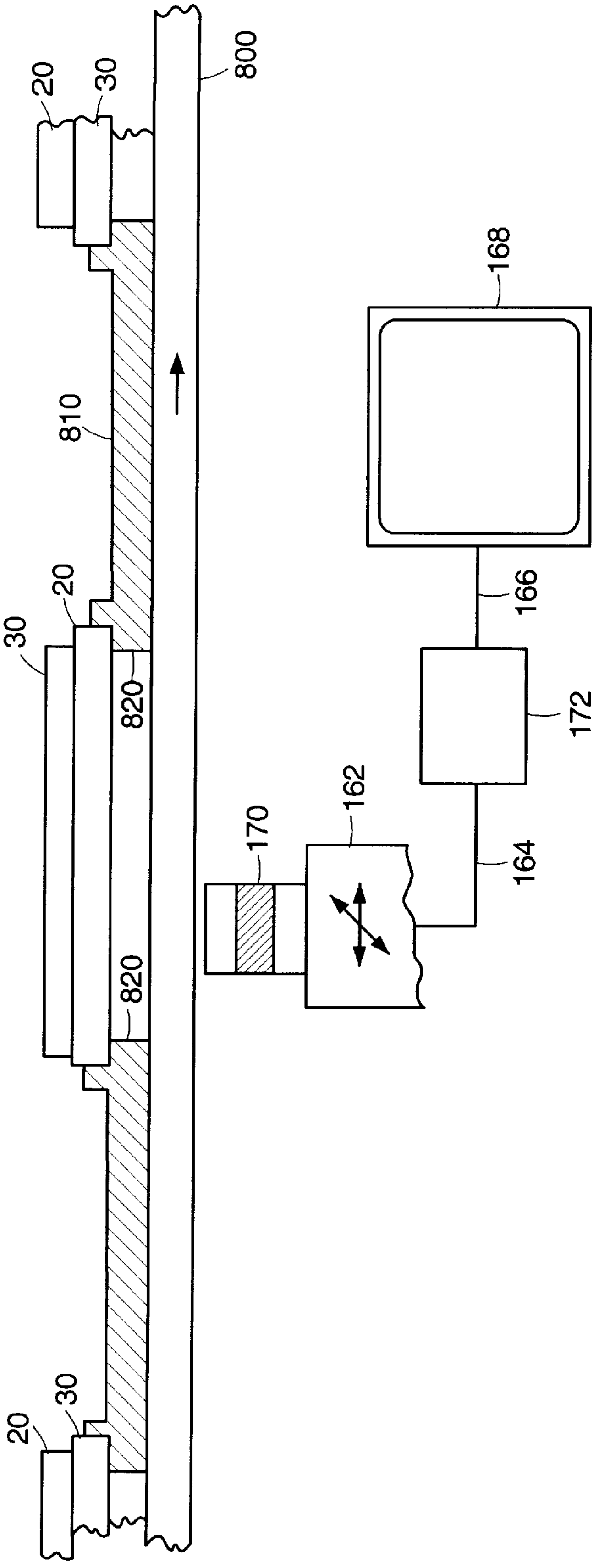

In the embodiment shown in FIG. 11, video camera 162 sends a signal representative of the veneering marks-on anode 20 and cathode 30 over signal cables 164, 166 to a video display 168 which presents an image of the superposed veneering marks, thereby allowing visual inspection of the alignment. To insure that the camera 162 has sufficient light to operate properly, a beam splitter (not shown) is used to shine light down the same optical path as the camera. Alternatively, a fiber-optic light source may be provided to illuminate the underside of anode 20. The camera 162 also may be provided, as shown, with optics 170 which provide magnification, for example 90×, of the veneering marks to allow for more precise observation. Either additionally (as shown) or alternatively, a computer 172 may provide electronically amplify or otherwise enhance the signal before it is displayed.

As indicated in FIG. 11, camera 162 is mounted in such a way that it can be moved in both the x and y directions. This permits each of the sets of veneering marks on the anode and cathode to be separately viewed, and for the particular set being viewed to be accurately centered in the camera's field of view.

Although the disclosed embodiment utilizes a video camera to observe the veneering marks on the anode and cathode, it will be evident that other alignment observers such as a CCD camera or the like may also be employed. Accordingly, as used in the claims, the term "alignment observer" means any device, system or apparatus that is capable of viewing the alignment marks on the anode and cathode or on similar superposed substrates.

In the embodiment of FIG. 11, the alignment of the anode and cathode is evaluated, and the acceptability of the alignment determined, by a human operator based on the image displayed on display 168. The extent of misalignment that is acceptable will depend on a number of things, including in particular the amount of misalignment indicated by the other sets of veneering marks 302, 306 on the bonded-together substrates being examined, and the percentage of devices being produced in which the degree of misalignment approaches the acceptable limit. It may, for example, be determined that the alignment of a bonded anode-cathode is acceptable if the maximum degree of misalignment indicated by any of the four sets of veneering marks on the bonded pieces does not exceed 2 microns.

If the alignment of the bonded cathode and anode is acceptable, conveyor 800 transports carrier 810 and the device to station 150 where the bonded anode and cathode are assembled into an FED package. If the alignment is not acceptable, the unsatisfactory device is removed from the productionline.

Figure 12:
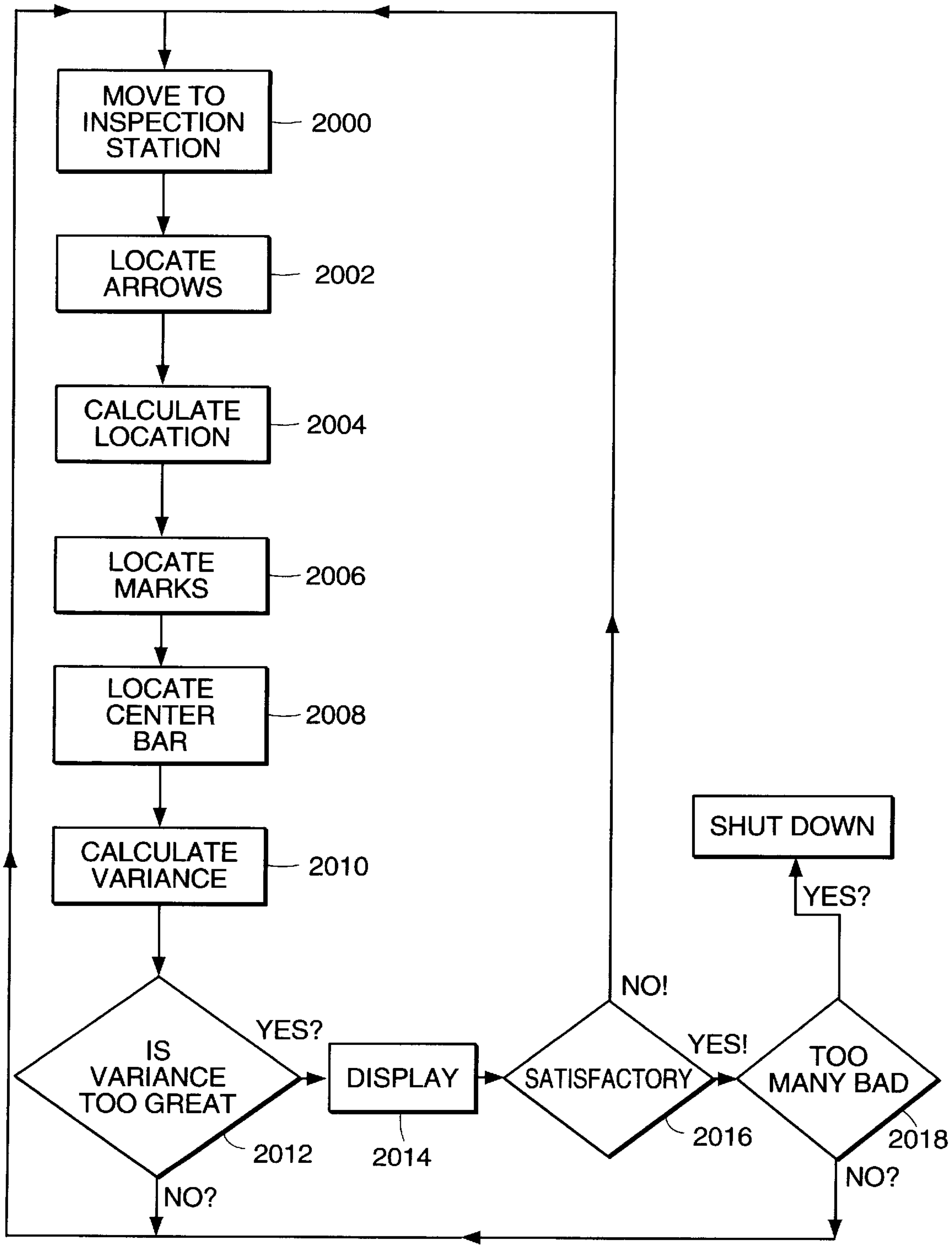
FIG. 12 is a flow chart illustrating a further embodiment of the invention.

In many instances, an operator will determine the acceptability of alignment based in large measure on the operator's skill and experience. In other instances, the acceptability of the alignment may be determined with the aid of a computer, such as computer 172, as shown in the flow chart of FIG. 12.

Figure 1:
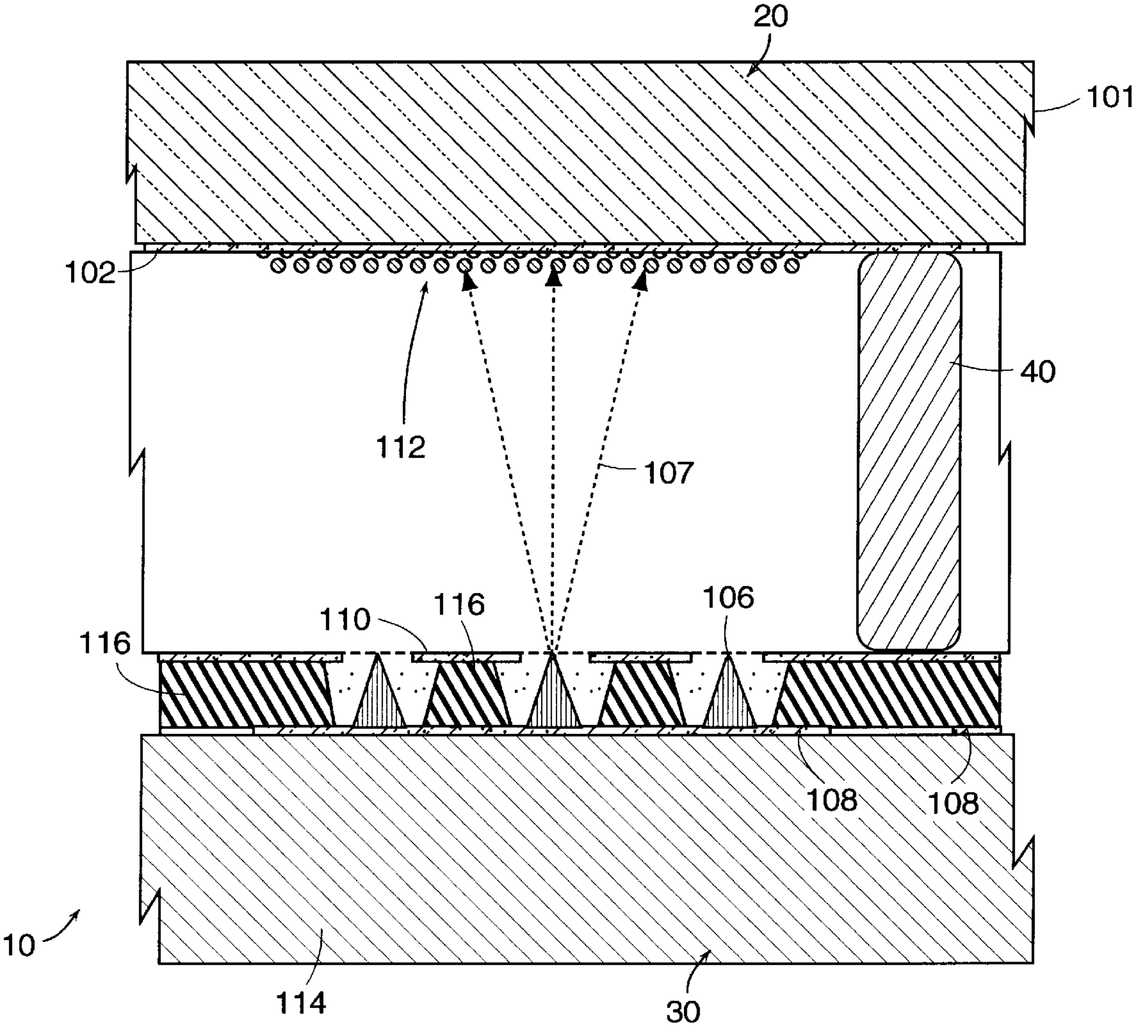
FIG. 1 (previously discussed) is a plan view showing a typical field emission display.
Figure 2:
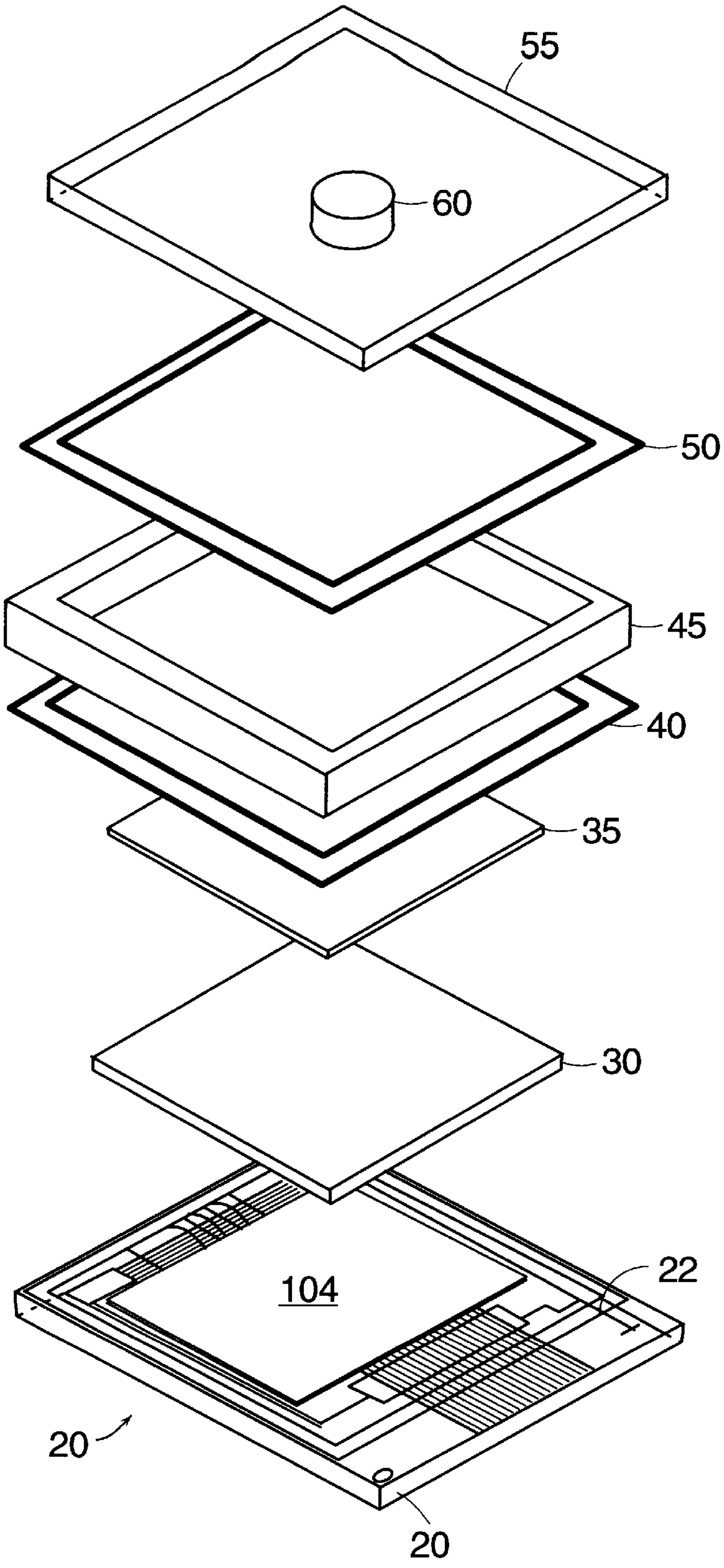
FIG. 2 (previously discussed) is an exploded diagram showing the components of a typical field emission display used in both the prior art and in the practice of the present invention.
Figure 3:
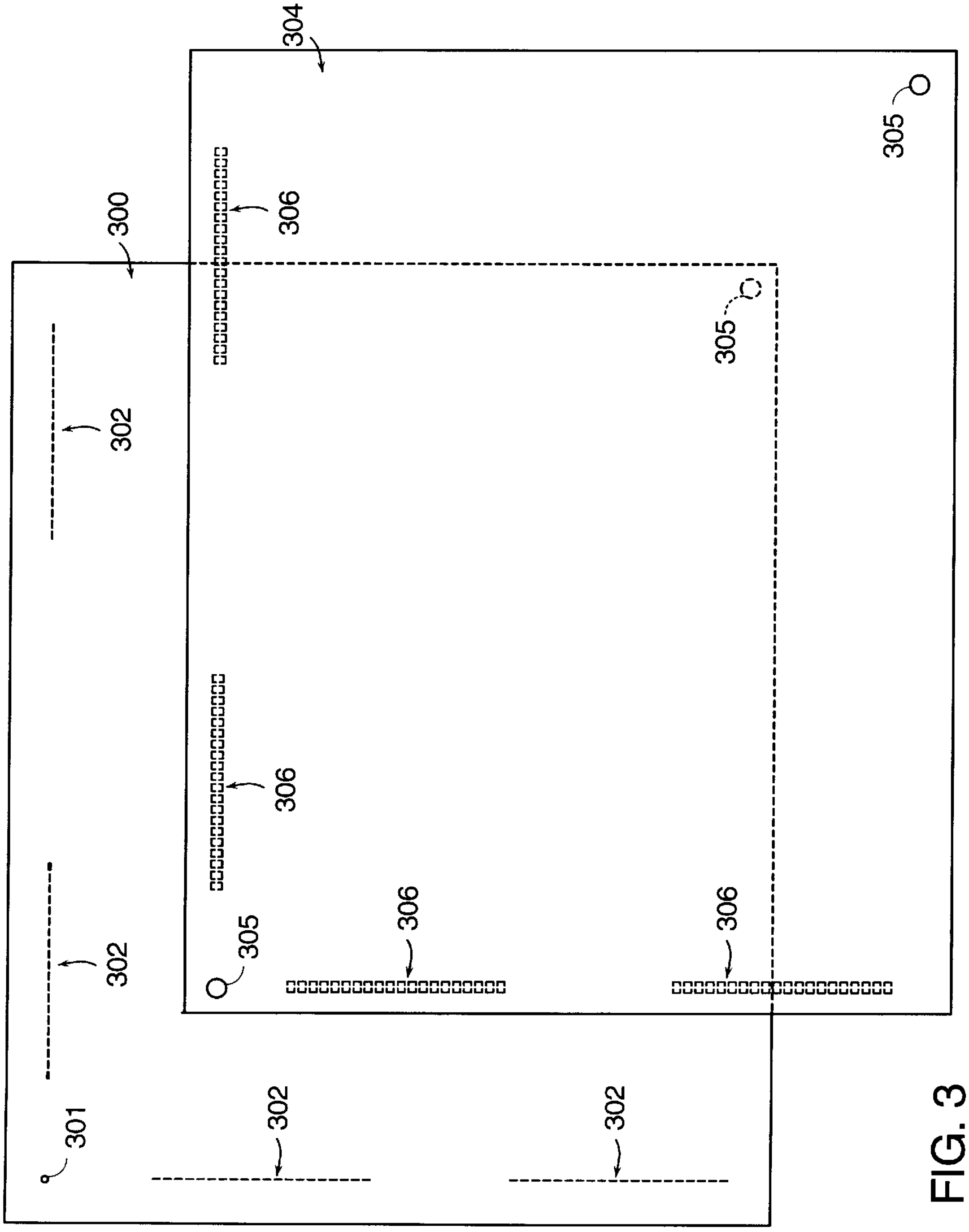
FIG. 3 (previously discussed) is a top view of substrates showing alignment and veneering marks useful both in prior art processes and in the practice of the present invention.
Figures 4, 5, 6, 6A, 7:
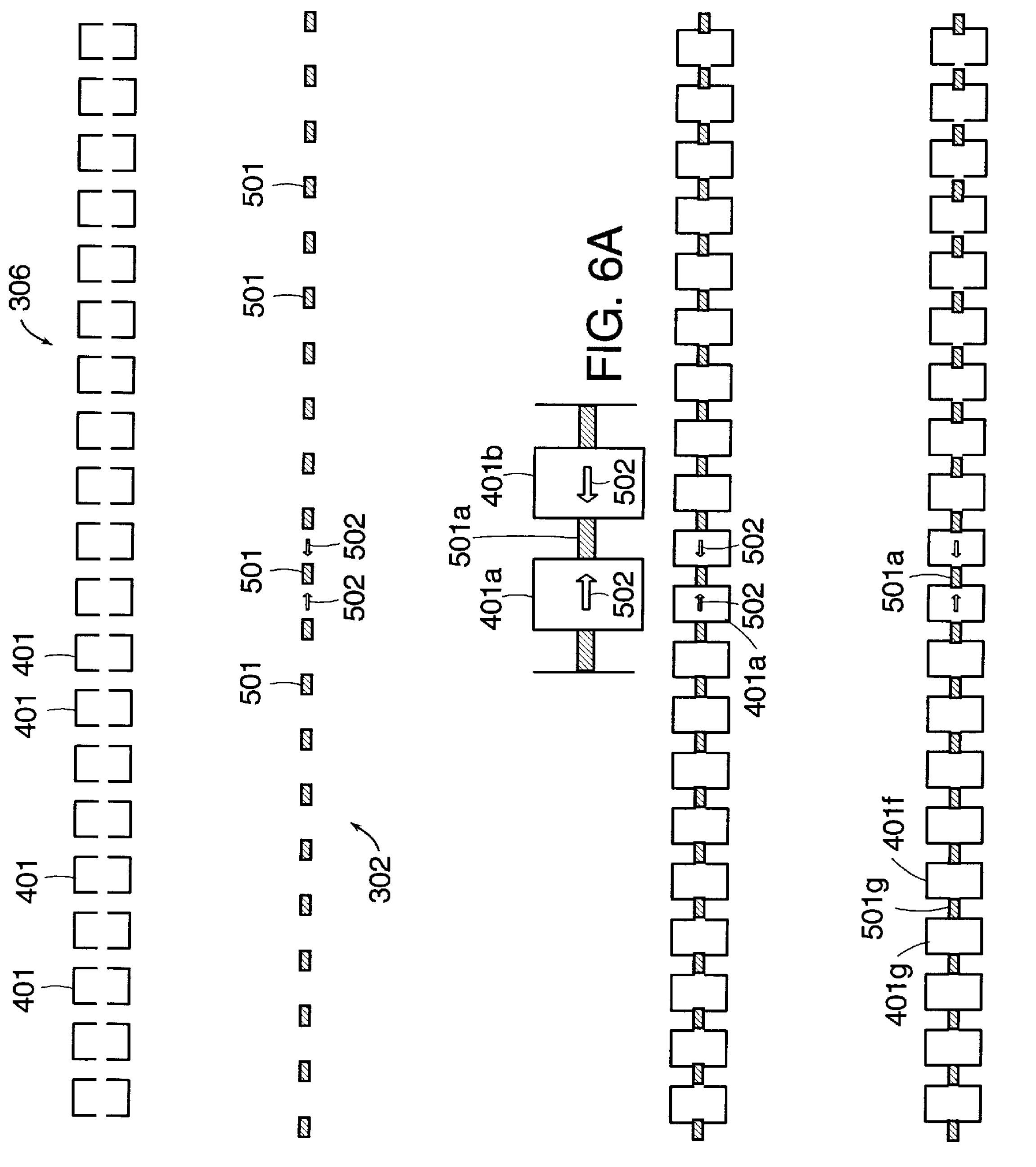
FIGS. 4 through 7 (previously discussed) are schematics showing the alignment and veneering marks of FIG. 3 in greater detail.

With reference to the flow chart, after the bonded-together anode and cathode are placed at the inspection station (step 2000), conventional pattern recognition is used to locate the arrows 502 of one of the sets of veneering marks 302 on the cathode (step 2002). The location (x and y coordinates) and angular orientation are then calculated (step 2004) and used to permit pattern recognition to locate the boxes 501 of the associated superposed veneering mark 306 on the anode 20. (step 2006). The location of the center bar 501*a* of the mark 302 (step 2008) and most apparently aligned bar (e.g., bar 501*g* if the anode and cathode are aligned to the extent shown in FIG. 7) are then calculated, and this information is used to calculate the apparent degree of alignment (step 2010), and then evaluate the degree of alignment to determine if it is satisfactory (step 2012). If, in step 2012, the apparent misalignment of a pair of indicators is less than a predetermined extent of misalignment, e.g. 2 microns, the system determines that this particular alignment is satisfactory and proceeds to determine and evaluate the alignment of the next set of venering marks 302, 306 on the bonded anode and cathode. If, on the other hand, step 2012 determines that the apparent misalignment is greater than 2 microns, the image of the indicators being evaluated is displayed on monitor 168 (step 2014) and the alignment is again evaluated, this time by a human operator (step 2016). If the human operator concludes that the alignment is satisfactory, the system proceeds to determine and evaluate the next set of indicators on the die. If the human operator evaluation determines that the alignment is not satisfactory, the particular device being evaluated is discarded, and the operator also determines the frequency at which the system is producing unsatisfactorily aligned devices (step 2018). If the frequency (e.g., percentage of rejects) is within some predetermined limit, the inspection procedure is permitted to continue; if it is not, the production line is shut down.

Although the invention has been described in connection with the bonding together of the anode and cathode of a FED, it will be apparent that the invention is also applicable to other electronic devices and structures in which the alignment of two superposed substrates, one of which is transparent, is viewed and evaluated.

More generally, it will also be recognized that the above described systems, apparatus, methods and procedures are exemplary of the invention, but are not limiting in that other systems, apparatus, methods and procedures will fall embody the invention and will fall within the scope of the appended claims.

What is claimed is:

1. A bonding and inspection system for bonding a first substrate to a second substrate and thereafter evaluating an alignment of said first substrate relative to said second substrate, said system comprising:

a bonding station;

an inspection system; and, a conveyor for transporting devices to be bonded and inspected successively to said bonding station and thereafter to said inspection system;

said bonding station including a first alignment observer for observing first alignment indicators on said first substrate and said second substrate, positioning said first and second substrates relative to each other on the basis of said observing, and then bonding said first and second substrates to each other; and, said inspection system including a second alignment observer for observing second alignment indicators on said first and second substrates.

2. The system of claim 1 wherein said first and second substrates are positioned above said conveyor, and said first and second alignment observers are positioned below said conveyor.

3. The system of claim 2 including a device carrier mounted on said conveyor, said carrier including locators for positioning a said device relative to carrier and an opening extending through the region of said carrier intermediate said locators such that a said device positioned by said locators may be visually viewed from below said carrier.

4. The system of claim 1 including a video display connected to said second alignment observer and arranged to produce an image of said second alignment indicators.

5. The system of claim 1 including a computer connected to said second alignment observer and operative to evaluate the alignment of said first substrate relative to said second substrate on the basis of said observation.

6. In a system for manufacturing a field emission display comprising an anode bonded to a cathode, said system including a transporter for advancing components of said field emission display successively to a plurality of processing stations, that improvement wherein:

said transporter includes a support for the said anode of a said field emission device, said support having an opening therethrough and locators for positioning said anode in a position overlying said opening; and, said inspection system including an alignment observer for observing alignment indicators on said anode and cathode through said opening and said anode.

7. The system of claim 4 wherein said transporter comprises a conveyor and a device carrier, said device carrier having a plurality of device support portions each of which includes respective said locators and a said opening.

8. The system of claim 5 wherein said alignment observer comprises a camera producing a signal representative of an image of said alignment indicators, and said system includes a computer operative to determine the acceptability of alignment of said anode and cathode on the basis of said signal and a display for displaying said image.

* * * * *